(12) United States Patent  
Kuan et al.

(10) Patent No.: US 7,130,289 B2
(45) Date of Patent: Oct. 31, 2006

(54) DETECTING A HIDDEN NODE IN A WIRELESS LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 596 days.

(21) Appl. No.: 10/099,222

(22) Filed: Mar. 14, 2002

(65) Prior Publication Data

US 2003/0174680 A1    Sep. 18, 2003

(51) Int. Cl.
*H04Q 7/24* (2006.01)
*H04J 3/24* (2006.01)

(52) U.S. Cl. ...................... 370/338; 370/349

(58) Field of Classification Search ........... 370/338, 370/349, 389, 392, 245, 241, 328
See application file for complete search history.

(56) References Cited

U.S. PATENT DOCUMENTS

| | | | | |
|---|---|---|---|---|
| 5,097,469 A | * | 3/1992 | Douglas | 370/245 |
| 5,185,735 A | * | 2/1993 | Ernst | 370/241 |
| 5,339,316 A | * | 8/1994 | Diepstraten | 370/401 |
| 5,461,627 A | * | 10/1995 | Rypinski | 370/349 |
| 5,592,483 A | * | 1/1997 | Hieda et al. | 370/349 |
| 5,594,731 A | * | 1/1997 | Reissner | 370/338 |
| 5,621,732 A | | 4/1997 | Osawa | |
| 5,636,220 A | * | 6/1997 | Vook et al. | 370/338 |
| 5,654,959 A | * | 8/1997 | Baker et al. | 370/331 |
| 5,661,727 A | * | 8/1997 | Kermani et al. | 370/445 |
| 5,737,328 A | | 4/1998 | Norman et al. | |
| 5,812,531 A | * | 9/1998 | Cheung et al. | 370/401 |
| 5,884,171 A | * | 3/1999 | Tanabe et al. | 455/434 |
| 5,963,559 A | * | 10/1999 | Ohki | 370/445 |
| 5,991,287 A | * | 11/1999 | Diepstraten et al. | 370/338 |
| 6,067,297 A | * | 5/2000 | Beach | 370/389 |

FOREIGN PATENT DOCUMENTS

EP    0597640    5/1994

OTHER PUBLICATIONS

IEEE Std 802.11 1997, Part 11: Wireless LAN MAC and PHY specificaions, LAN MAN Standard Committee, Jun. 26, 1997.*

* cited by examiner

*Primary Examiner*—Andrew C. Lee
(74) *Attorney, Agent, or Firm*—Morrison & Foerster LLP (57) ABSTRACT

A method and system for detecting a hidden node in a wireless local area network having a first station, a second station, and an access point. The first station can send a message, where the message can be sent as a data frame. After receiving the message, the access point can send the message to the second station. The second station can receive the message from the access point. In response to receiving the message, the second station can send an acknowledgement to the access point, where the acknowledgement can be sent as a control frame. The first station can monitor for the acknowledgement sent from the second station to the access point.

64 Claims, 8 Drawing Sheets

DETECTING A HIDDEN NODE IN A WIRELESS LOCAL AREA NETWORK

BACKGROUND

1. Field of the Invention

The present invention generally relates to wireless local area networks. More particularly, the present invention relates to detecting a hidden node in a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the quality of communications over a WLAN can vary for reasons that are not present in wired LANs. For example, stations in a WLAN can communicate with other stations in the WLAN through an access point ("AP"). More particularly, each station can have a transmission range within which the station can transmit signals to an AP within the WLAN.

Other stations located within this transmission range can detect signals transmitted by the station. After detecting signals transmitted by the station, these other stations can wait to send their own signals until the wireless medium is free from traffic generated by the station. However, because a station can have a limited transmission range, other stations located outside of this transmission range, typically called "hidden nodes," can exist in a WLAN. These "hidden nodes" can send signals across the WLAN that can collide with signals sent by the station. This type of collision arising from the presence of "hidden nodes" is typically called the "hidden node problem."

The collision of messages resulting from the "hidden node problem" can create unacceptable performance and reliability problems in a WLAN. For instance, each message that is interrupted by a collision can be resent according to the IEEE 802.11 standard. However, resending the message can delay the receipt of the message at its destination. In addition, each resent message can consume additional bandwidth in the WLAN. Such delays and bandwidth consumption can affect other messages being sent across the WLAN, thereby creating performance and reliability problems in the WLAN.

SUMMARY

The present invention relates to detecting a hidden node in a wireless local area network having a first station, a second station, and an access point. In one exemplary embodiment, the first station can send a message, where the message is sent as a data frame. After receiving the message, the access point can send the message to the second station. The second station can receive the message from the access point. In response to receiving the message, the second station can send an acknowledgement to the access point, where the acknowledgement can be sent as a control frame. The first station can monitor for the acknowledgement sent from the second station to the access point.

In another exemplary embodiment, the access point can send a message to the second station, where the message can be sent as a data frame. The second station can receive the message from the access point. In response to receiving the message, the second station can send an acknowledgement to the access point, where the acknowledgement can be sent as a control frame. The first station can detect the message sent from the access point to the second station. Furthermore, the first station can monitor for the acknowledgement sent from the second station to the access point.

DESCRIPTION OF THE DRAWING FIGURES

The present invention can be best understood by reference to the following detailed description taken in conjunction with the accompanying drawing figures, in which like parts may be referred to by like numerals.

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
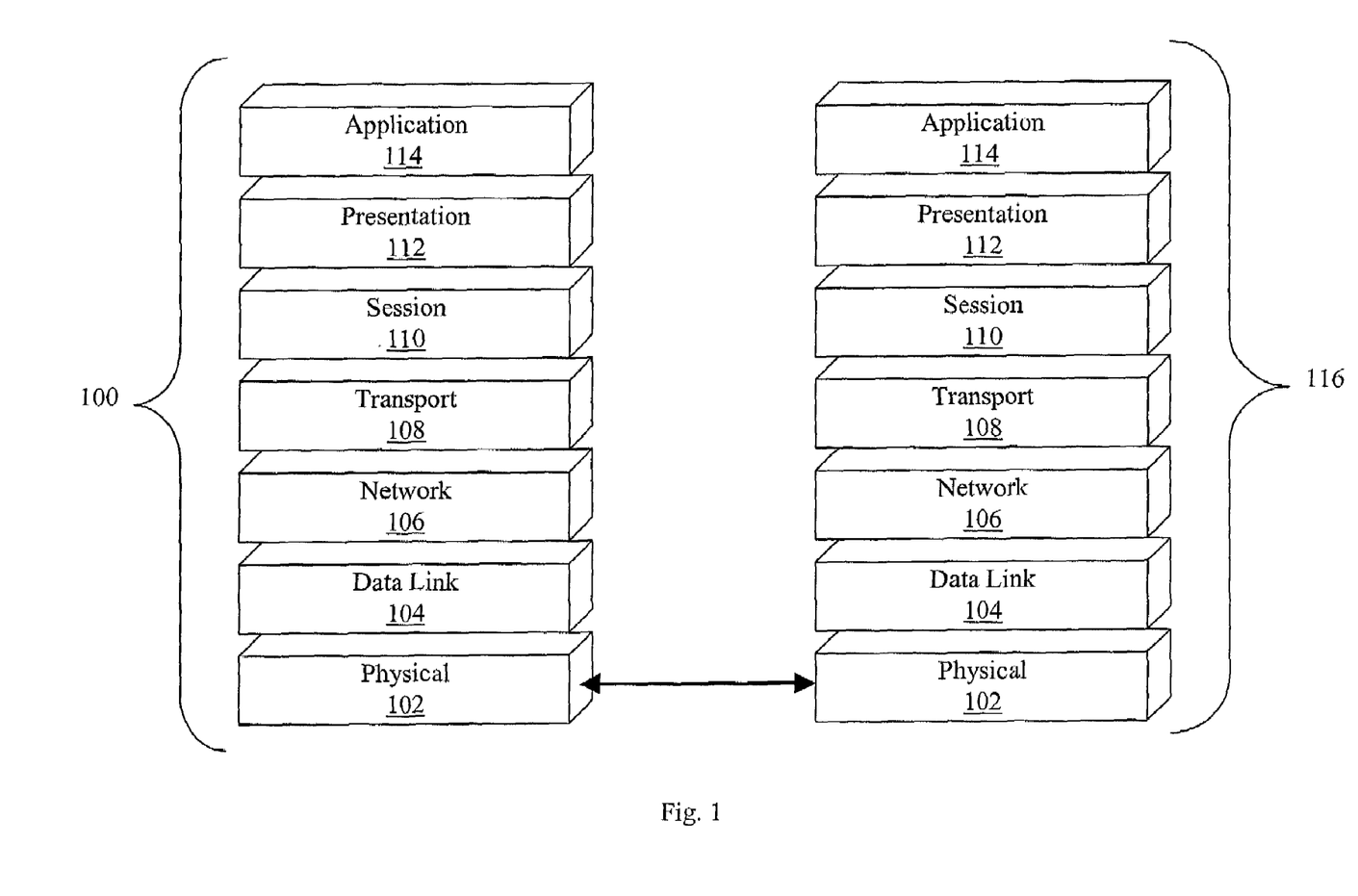
FIG. 1 shows an exemplary OSI seven layer model.

With reference to FIG. 1, an exemplary OSI seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102. However, different computers 100 and 116 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
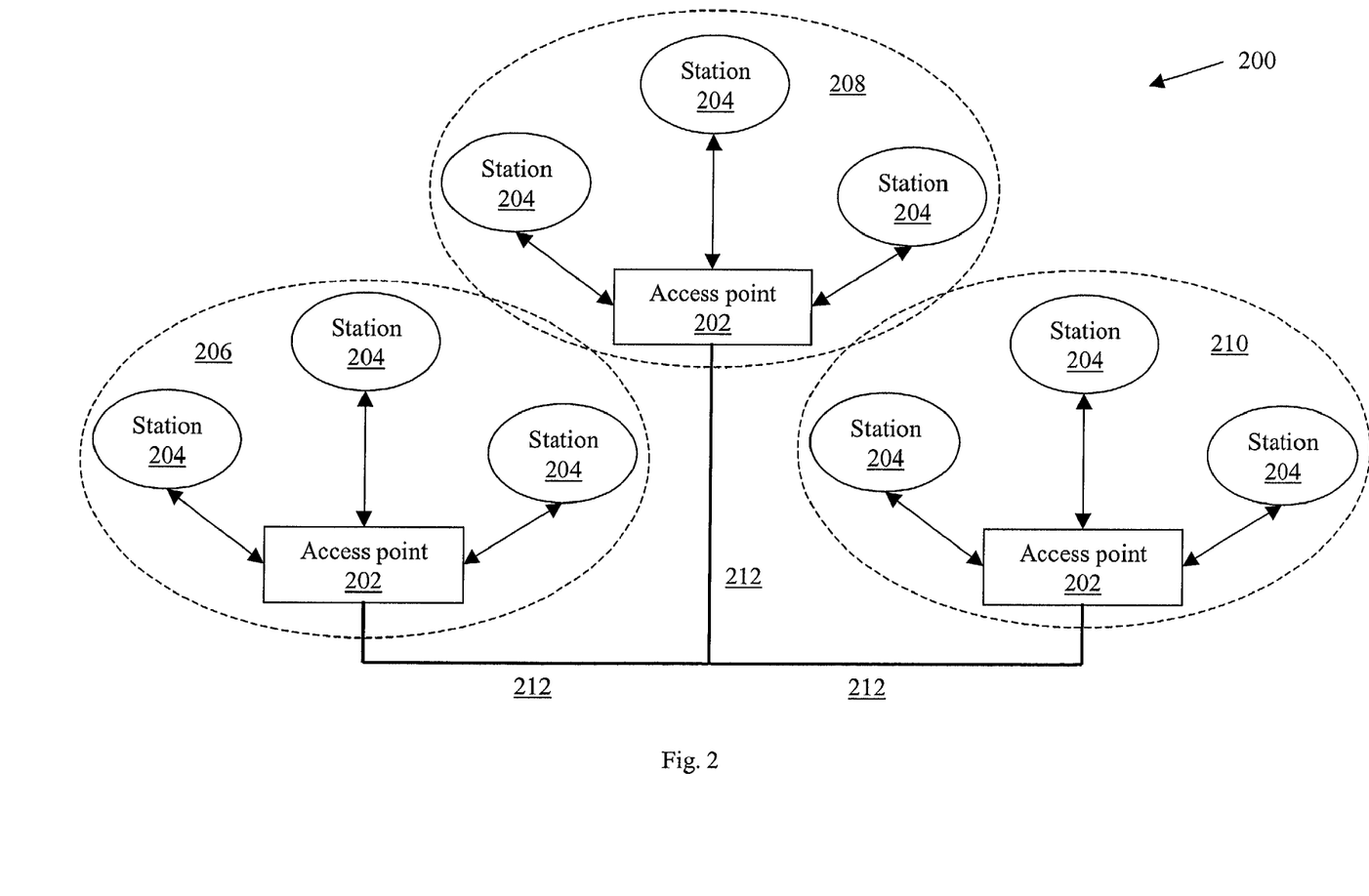
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206, 208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
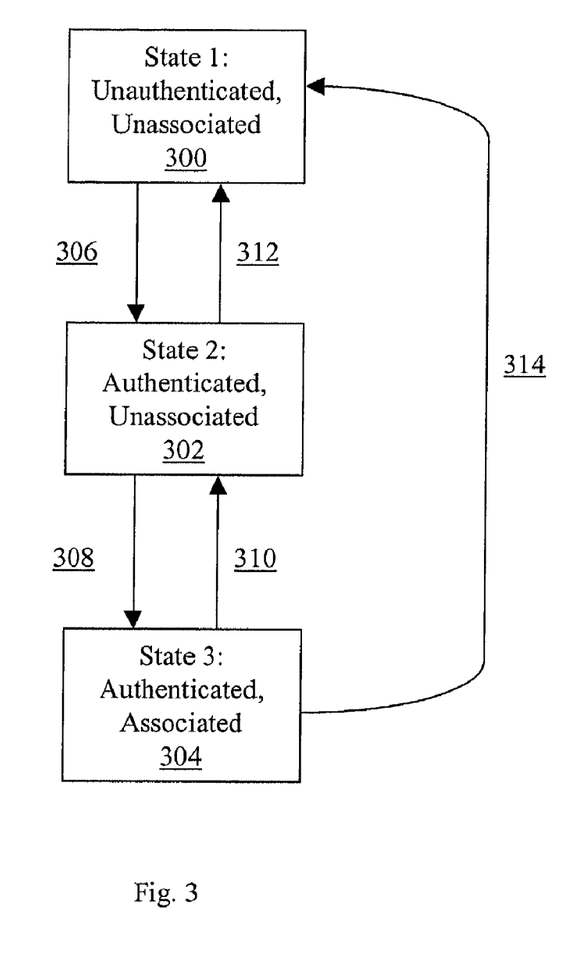
FIG. 3 is an exemplary flow diagram illustrating various states of stations in a WLAN.

With reference to FIGS. 2 and 3, under the current IEEE 802.11 standard, each station 204 must be authenticated to and associated with an AP 202 in order to become a part of a BSS 206, 208, or 210. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204.

As noted earlier, WLANs can provide users with increased mobility, in comparison to wired LANs, but the quality of communications over a WLAN can vary for reasons that are not present in wired LANs. For example, as described above with regard to FIG. 2, stations 204 can communicate with other stations 204 through an AP 202. More particularly, each station 204 can have a transmission range within which station 204 can transmit signals to an AP 202 within the WLAN. Different stations 204 within a WLAN can have different transmission ranges, depending on the characteristics of the devices used as stations 204. For example, a handheld device used as station 204 can have a different transmission range than a laptop used as station 204.

When a station 204 transmits a signal to an AP 202, other stations 204 can be located within the transmission range of the station 204 transmitting the signal. These other stations 204 can detect the transmitted signal and can wait to send their own signals until the wireless medium is free from traffic associated with the transmitted signal. However, as described above, because a station can have a limited transmission range, other stations located outside of this transmission range, typically called "hidden nodes," can exist in a WLAN. These "hidden nodes" can send signals across the WLAN that can collide with signals sent by the station. This type of collision arising from the presence of "hidden nodes" is typically called the "hidden node problem."

Figure 4:
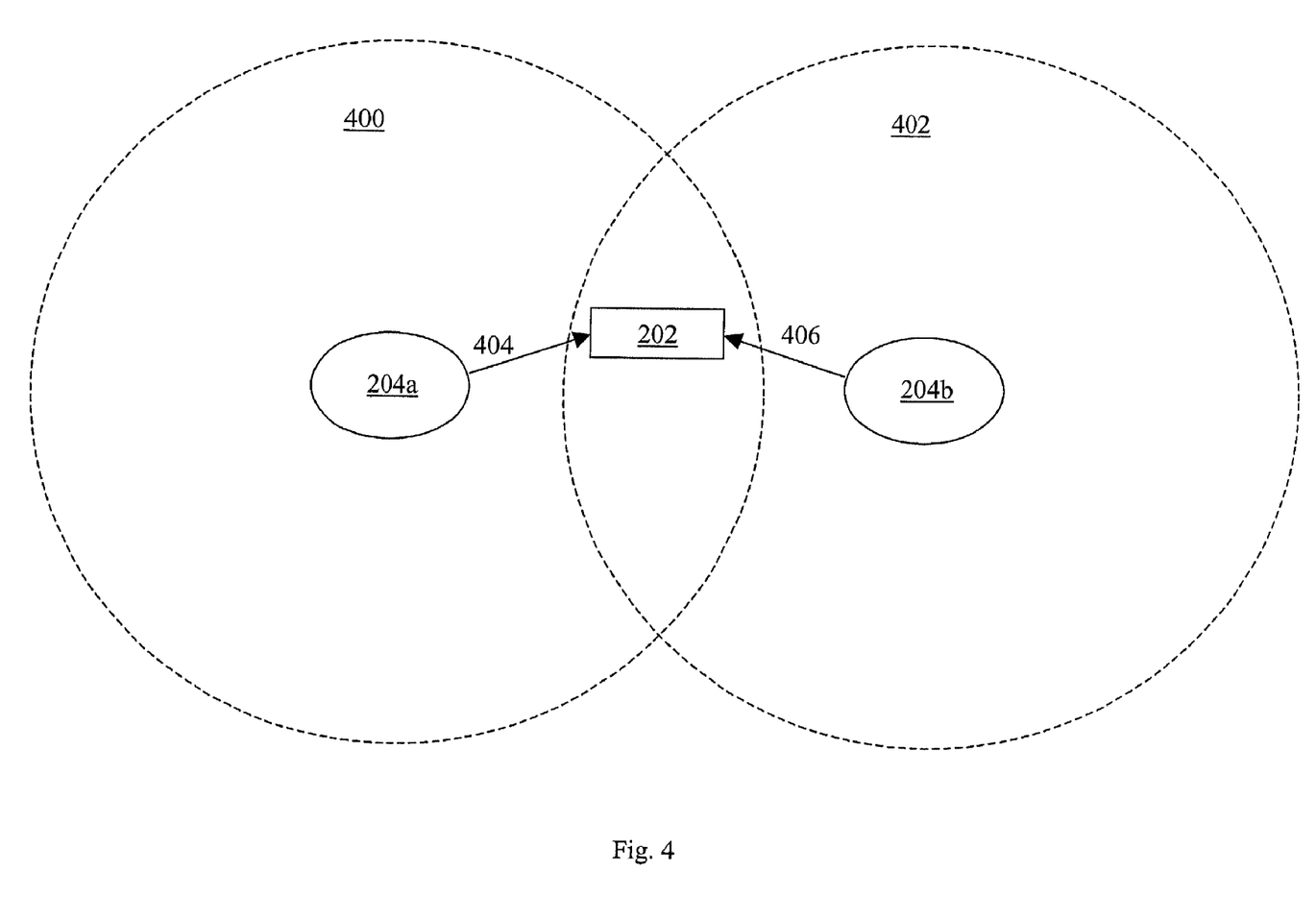
FIG. 4 shows an exemplary embodiment of the hidden node problem.

More particularly, FIG. 4 depicts an exemplary embodiment of the "hidden node problem." With reference to FIG. 4, stations 204a and 204b are both authenticated to and associated with AP 202. Furthermore, station 204a has a transmission range 400 and station 204b has a transmission range 402. Because station 204a is not located within the transmission range 402 for station 204b and because station 204b is not located within the transmission range 400 for station 204a, stations 204a and 204b can both send messages to AP 202 during the same time period without being aware that the other station has sent a message to AP 202. Specifically, station 204a can send message 404, which can be detected by stations 204 (FIG. 2) within transmission range 400. Because station 204b is located outside of transmission range 400, station 204b cannot detect message 404. During the same time period, station 204b can send message 406 to AP 202, without being aware that message 404 is also being sent over the WLAN. Message 406 can be detected by stations 204 (FIG. 2) within transmission range 402. Because station 204a is located outside of transmission range 402, station 204a cannot detect message 406. Stations 204a and 204b are typically considered "hidden nodes" of one another because they are located outside of each other's transmission range.

In the present exemplary embodiment, because messages 404 and 406 are transmitted to AP 202 during the same time period, messages 404 and 406 can collide at AP 202. This collision can interrupt the delivery of both messages. Typically, the collision of messages originating from hidden nodes in this manner is called the "hidden node problem."

The collision of messages resulting from the "hidden node problem" can create unacceptable performance and reliability problems in a WLAN. For instance, each message that is interrupted by a collision can be resent according to the IEEE 802.11 standard. However, resending the message can delay the receipt of the message at its destination. In addition, each resent message can consume additional bandwidth in the WLAN. Such delays and bandwidth consumption can affect other messages being sent across the WLAN, thereby creating performance and reliability problems in the WLAN.

Figure 5:
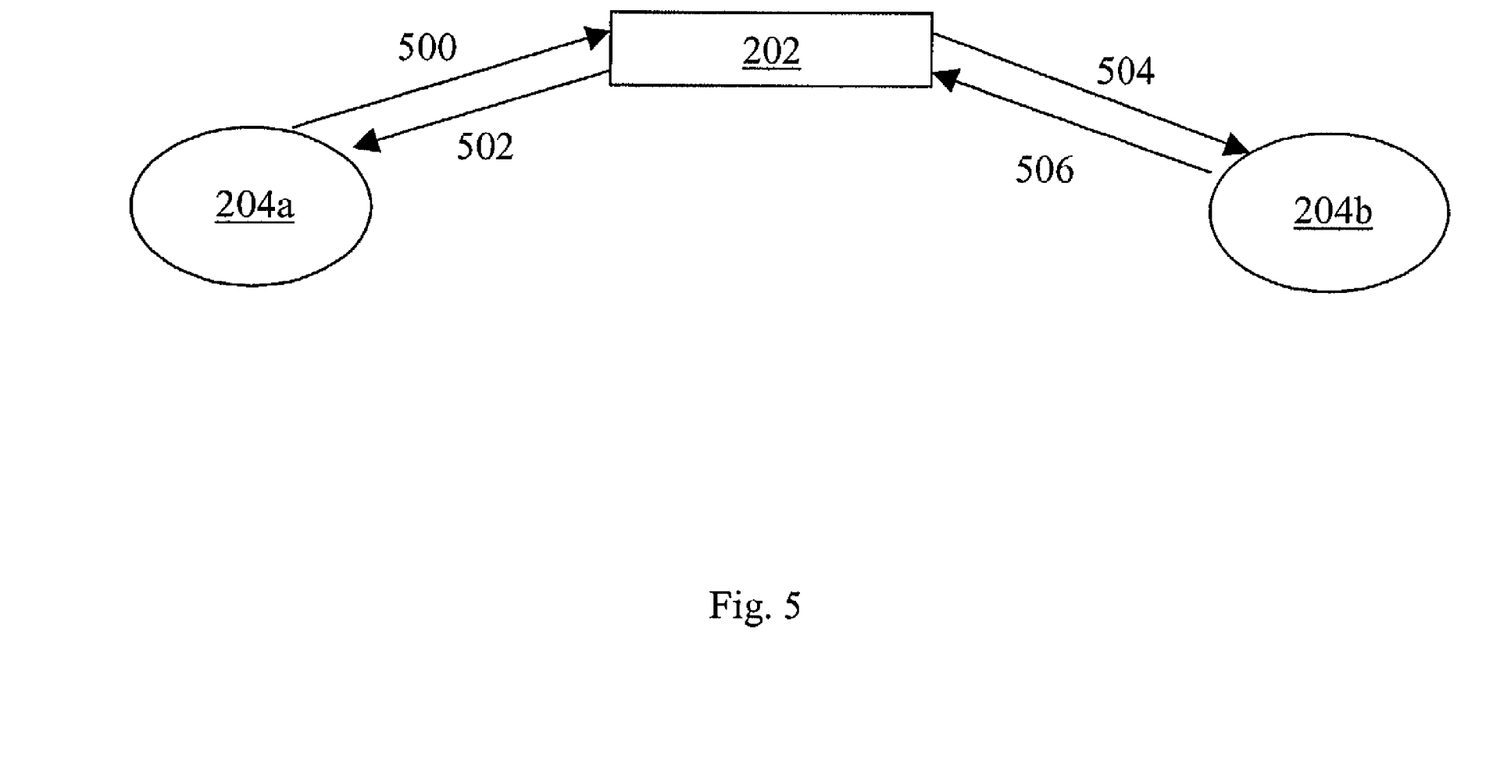
FIG. 5 shows an exemplary sequence of frame exchanges.
Figure 6:
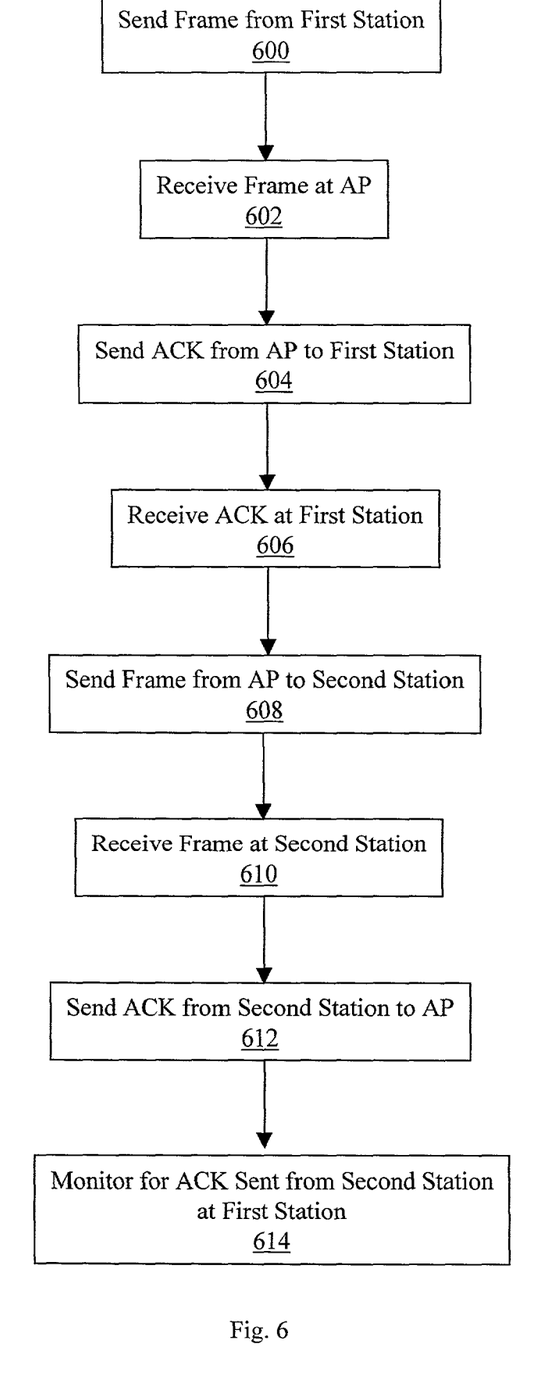
FIG. 6 shows an exemplary flow diagram of a process that can be used to detect a hidden node.

Accordingly, identifying hidden nodes in a WLAN can be useful in determining the characteristics of a WLAN, such as the potential for performance and reliability problems in the WLAN. With reference to FIGS. 5 and 6, an exemplary embodiment of a process that can be used to identify hidden nodes for a station in a WLAN is depicted. More particularly, station 204a can obtain a list of medium access control ("MAC") addresses for stations 204b in a WLAN by any convenient method. For instance, station 204a can discover stations 204b and their associated MAC addresses by detecting signals transmitted over the WLAN for a period of time, and from various locations. In another example, a list of MAC addresses can be imported to station 204a. For instance, a list of stations 204b associated with AP 202 can be imported to station 204a.

Figure 7:
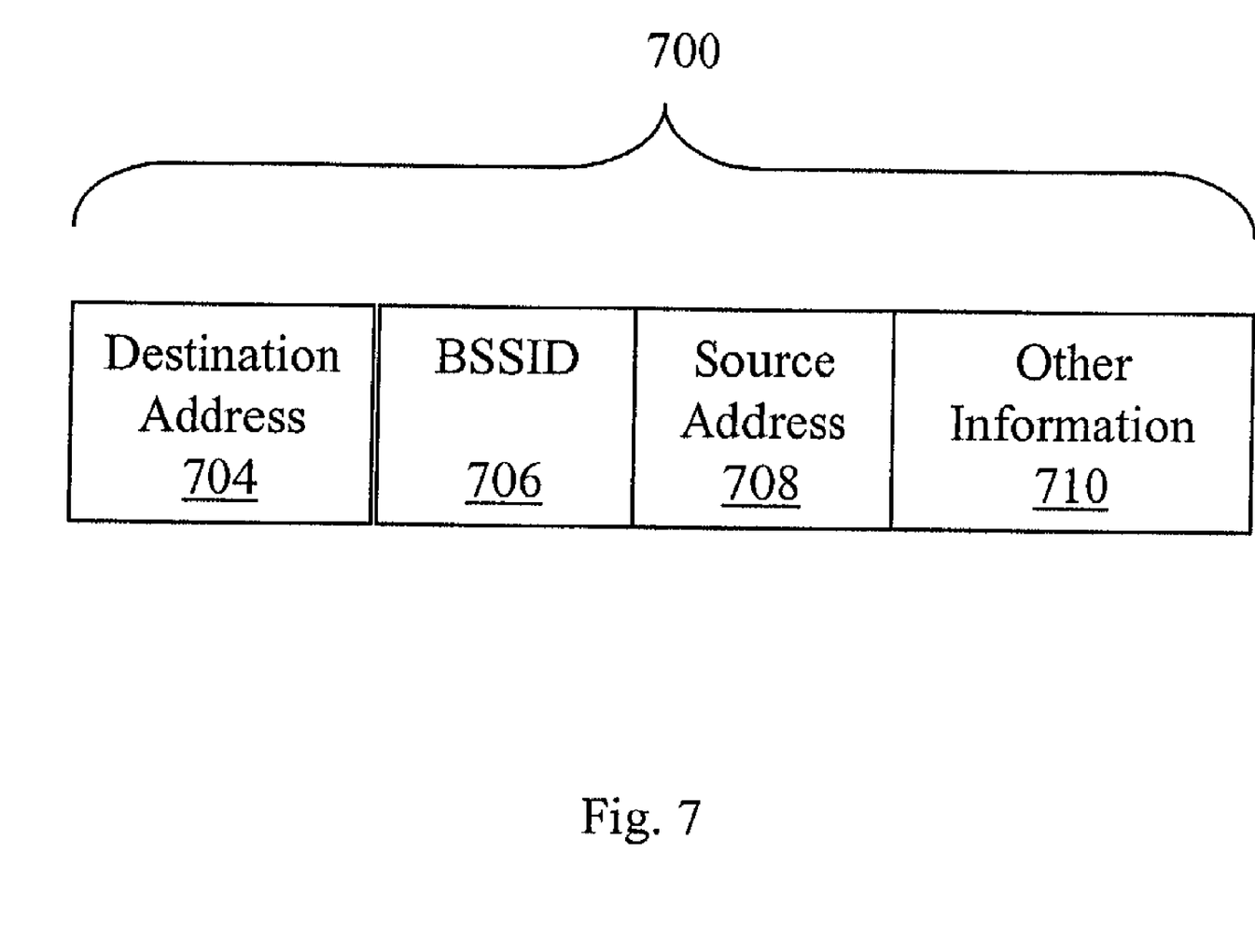
FIG. 7 shows an exemplary header that can be included in a frame.

In the present embodiment, after station 204a obtains MAC addresses for stations 204b, then station 204a can determine which stations 204b are hidden nodes to station 204a. More particularly, station 204a can determine if station 204b is a hidden node during sequence of frame exchanges across the WLAN. In step 600, station 204a can send a message 500. With reference to FIG. 7, message 500 can include a header 700, having a destination address 704, a basic service set identification ("BSSID") 706, a source address 708, and other information 710. Specifically, header 700 in message 500 can have a destination address 704 set to station 204b, a BSSID 706 set to AP 202, and a source address 708 set to station 204a.

In step 602, AP 202 can receive message 500. In response to receiving message 500, then in step 604, AP 202 can send an acknowledgement ("ACK") 502 to station 204a. In step 606, station 204a can receive ACK 502. In some embodiments, if station 204a does not receive ACK 502 from AP 202 within a specified period of time, then station 204a can resend message 500, and begin again from step 600 of FIG. 6.

According to the present exemplary embodiment, in step 608, AP 202 can send message 500 to station 204b as message 504, based on the destination address 704 set forth in header 700 of message 500. Next, in step 610, station 204b can receive message 504 from AP 202. In response to receiving message 504, then in step 612, station 204b can send ACK 506 to AP 202. ACK 506, sent from station 204b, can be transmitted across the WLAN throughout a transmission range 402 (FIG. 4). As described above, other stations 204 (FIG. 2) that are located in this transmission range can detect ACK 506.

Next, in step 614, station 204a can monitor for ACK 506. If station 204a can detect ACK 506, then station 204a is within transmission range 402 (FIG. 4) of station 204b. If station 204a cannot detect ACK 506, then station 204a is not within transmission range 402 (FIG. 4) of station 204b. Furthermore, if station 204a is within transmission range 402 (FIG. 4) of ACK 506, then station 204b is not a hidden node of station 204a. Alternatively, if station 204a is not within transmission range 402 (FIG. 4) of ACK 506, then station 204b is a hidden node of station 204a.

In step 614, it should be recognized that station 204a can fail to detect ACK 506 for various reasons. For instance, if AP 202 fails to send message 504 to station 204b, then station 204b would not send ACK 506. In this case, there would be no ACK 506 for station 204a to detect, and station 204a's failure to detect ACK 506 could be attributed to transmission problems between AP 202 and station 204b. Accordingly, in some applications, if station 204a does not detect ACK 506, station 204a can send another message 500 and monitor for another ACK 506. By repetitively sending messages 500 and monitoring for ACKs 506, station 204a can more confidently determine whether station 204b is a hidden node of station 204a. If station 204a receives any ACK 506 from station 204b, then station 204a can determine that station 204b is not a hidden node. Alternatively, if station 204a does not receive any ACK 506 from station 204b, then station 204a can determine that station 204b is a hidden node with more confidence as the number of messages 500 repetitively sent from station 204a increases.

After determining whether station 204b is a hidden node of station 204a, station 204a can repeat the above described process for other stations 204b in the list described above. Although the present embodiment describes obtaining a list of MAC addresses for stations 204b in a WLAN, it should be recognized that a single MAC address can be obtained in order to determine if a specific station 204b having the single MAC address is a hidden node of a station 204a.

Figure 8:
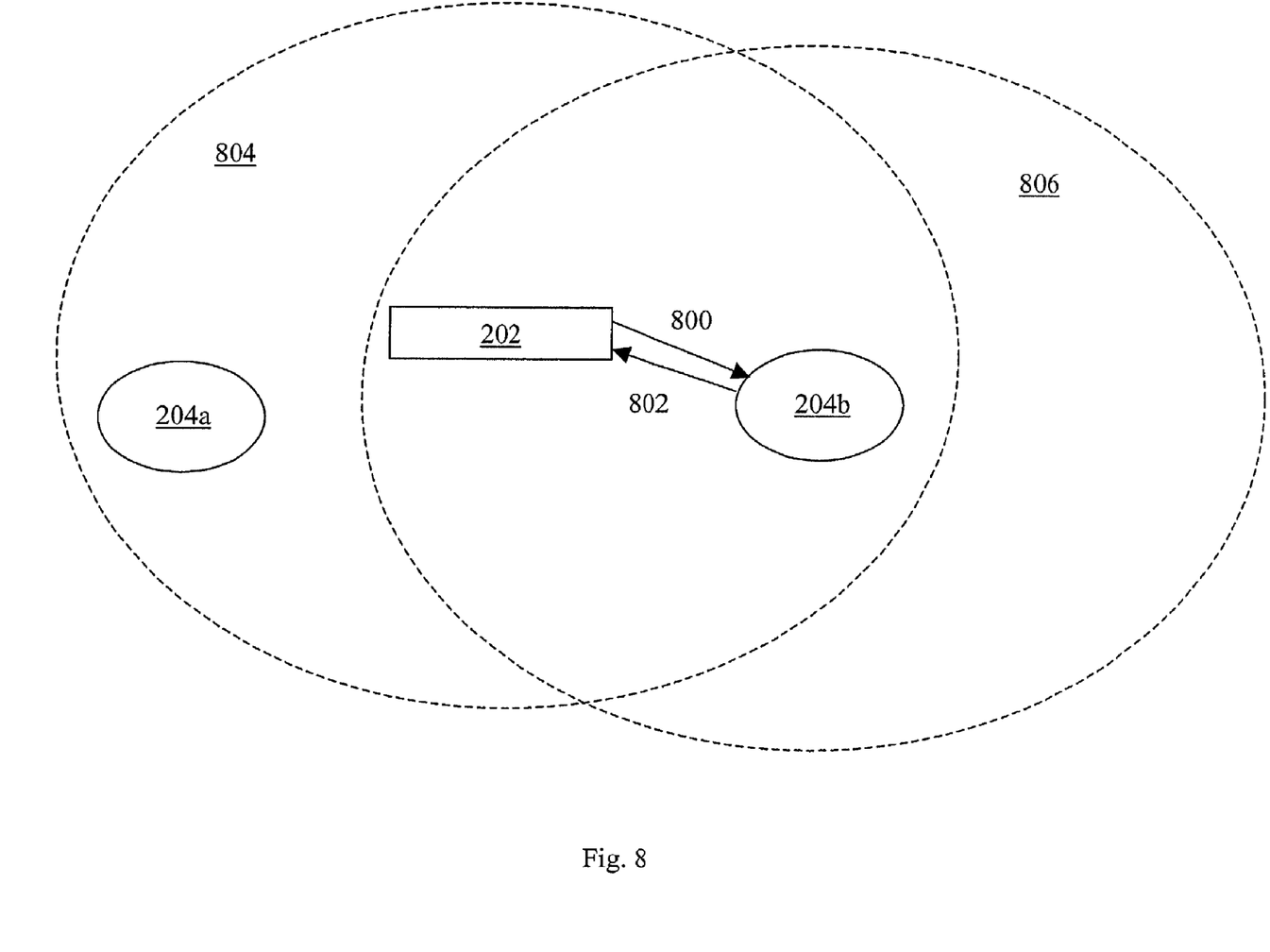
FIG. 8 shows an exemplary sequence of frame exchanges.

With reference to FIG. 8, another exemplary process that can be used to identify hidden nodes for a station in a WLAN is depicted. More particularly, station 204a can be located within transmission range 804 of AP 202. Although station 204a can be associated with AP 202, it should be recognized that station 204a can be unassociated with AP 202 in some applications. When AP 202 sends a message 800, which can originate from any station 204 (FIG. 2) or from any AP 202 in the WLAN, to station 204b, station 204a can detect this message 800. In response to receiving message 800, station 204b can send ACK 802 to AP 202. This ACK 802 can be detected by stations 204 or APs 202 (FIG. 2) within transmission range 806 of station 204b.

After detecting message 800, station 204a can monitor for ACK 802, which can be sent from station 204b to AP 202. If station 204a can detect ACK 802, then station 204a is within transmission range 806 of station 204b. If station 204a cannot detect ACK 802, then station 204a is not within transmission range 806 of station 204b, as shown in FIG. 8. Furthermore, if station 204a is within transmission range 806 of ACK 802, then station 204b is not a hidden node of station 204a. Alternatively, if station 204a is not within transmission range 806 of ACK 802, then station 204b is a hidden node of station 204a.

One advantage of the present embodiment includes allowing station 204a to passively monitor the WLAN for messages sent by an AP and to passively monitor for ACKs sent to the AP from a receiving station. By passively monitoring the WLAN in this manner, station 204a can obtain information about hidden nodes in the WLAN without consuming bandwidth or interfering with traffic over the WLAN. Furthermore, station 204a can passively monitor multiple stations in the WLAN during the same time period. Although the exemplary embodiments described above are described separately, it should be recognized that these exemplary embodiments can be combined. Such a combination can allow a station to actively monitor the WLAN according to the previously described exemplary embodiment and passively monitor the WLAN according to the present embodiment, during the same time period.

In each of the exemplary processes described above, station 204a can be mobile, portable, stationary, and the like. For instance, station 204a can be a laptop computer, a personal digital assistant, and the like. In addition, station 204a can be used by a user as a diagnostic tool, by an administrator as an administrative tool, and the like, to assess the quality of communications in the WLAN.

Furthermore, the messages described above with regard to the "hidden node problem" and exemplary embodiments are sent as data frames according to the IEEE 802.11 standard. More particularly, in accordance with the current IEEE 802.11 standard, data frames can have lengths of at least 29 bytes. In contrast, the ACKs are sent as control frames. In accordance with the current IEEE 802.11 standard, control frames can have lengths of at most 20 bytes. For instance, a standard IEEE 802.11 ACK has a length of 14 bytes. It should be noted that these size limitations for data frames and control frames may change if the IEEE 802.11 standard is revised.

In addition to being smaller in size than data frames, control frames are solely generated at the data link layer 104 (FIG. 1) and below. For example, when a message is received, an ACK is automatically generated at and sent out from data link layer 104 (FIG. 1) at AP 202. As such, the received message does not need to be processed above data link layer 104 (FIG. 1) in order for the ACK frame to be generated and sent.

As described above, the messages and ACKs described above can be detected by stations and APs within the transmission range of the station or AP sending the messages or ACKs. Furthermore, the information detected can include header information, such as the source address, destination address, BSSID, and the like. Accordingly, this information can be used in the exemplary embodiments described above to gather information about stations that are hidden nodes in the system.

Although the present invention has been described with respect to certain embodiments, examples, and applications, it will be apparent to those skilled in the art that various modifications and changes may be made without departing from the invention.

We claim:

1. A method of detecting a hidden node in a wireless local area network having a first station and a second station both associated with an access point, the method comprising:
    sending a message from the first station,
        wherein the message is sent as a data frame;
    receiving the message at the access point;
    sending the message from the access point to the second station;
    receiving the message from the access point at the second station;
    sending an acknowledgement from the second station to the access point in response to receiving the message at the second station,
        wherein the acknowledgement is sent as a control frame; and
    monitoring at the first station for the acknowledgement sent from the second station to the access point to detect the hidden node.

2. The method of claim 1, further comprising determining that the second station is a hidden node of the first station if the first station fails to detect the acknowledgement.

3. The method of claim 1, further comprising determining that the second station is not a hidden node of the first station if the first station detects the acknowledgement.

4. The method of claim 1, further comprising:
    sending an acknowledgement from the access point to the first station in response to receiving the message at the access point,
        wherein the acknowledgement is sent from the access point to the first station as a control frame;
    receiving the acknowledgement sent from the access point at the first station.

5. The method of claim 1, further comprising resending the message from the first station if the first station fails to receive an acknowledgement from the access point for the message within a specified period of time.

6. The method of claim 1, wherein the message includes a header having a destination address set to the second station, a BSSID set to the access point, and a source address set to the first station.

7. The method of claim 1, wherein the data frame and the control frame are sent and received below a network layer in an OSI model.

8. The method of claim 1, wherein the data frame and the control frame are sent at a data link layer of an OSI model according to the IEEE 802.11 standard.

9. The method of claim 1,
    wherein the data frame is at least 29 bytes in length,
    wherein the control frame is at most 20 bytes in length, and
    wherein the acknowledgement is 14 bytes in length.

10. The method of claim 1, wherein the first station is a diagnostic tool.

11. The method of claim 1, wherein the first station is an administrative tool.

12. The method of claim 1, further comprising:
    repetitively sending messages from the first station,
        wherein the messages are sent as a data frames; and
    monitoring at the first station for acknowledgements sent from the second station to the access point,
        wherein the acknowledgements are sent as control frames.

13. The method of claim 12, further comprising determining that the second station is not a hidden node of the first station if the first station detects at least one acknowledgement sent from the second station to the access point.

14. The method of claim 12, further comprising determining that the second station is a hidden node of the first station if the first station fails to detect at least one acknowledgement sent from the second station to the access point.

15. A method of detecting a hidden node in a wireless local area network having a first station and a second station both associated with an access point, the method comprising:
    sending a message from the first station to the second station through the access point,
        wherein the message is sent as a data frame; and
    monitoring at the first station for an acknowledgement sent from the second station to the access point to detect the hidden node, wherein the acknowledgement is sent by the second station in response to receiving the message from the access point,
wherein the acknowledgement is sent as a control frame.

16. The method of claim 15, further comprising determining that the second station is a hidden node of the first station if the first station fails to detect the acknowledgement.

17. The method of claim 15, further comprising determining that the second station is not a hidden node of the first station if the first station detects the acknowledgement.

18. The method of claim 15, further comprising:
receiving an acknowledgement at the first station from the access point,
wherein the acknowledgement is sent by the access point in response to receiving the message from the first station,
wherein the acknowledgement is sent as a control frame.

19. The method of claim 15, further comprising resending the message from the first station if the first station fails to receive an acknowledgement from the access point for the message within a specified period of time.

20. The method of claim 15, wherein the message includes a header having a destination address set to the second station, a BSSID set to the access point, and a source address set to the first station.

21. The method of claim 15, wherein the data frame and the control frame are sent and received below a network layer in an OSI model.

22. The method of claim 15, wherein the data frame and the control frame are sent at a data link layer of an OSI model according to the IEEE 802.11 standard.

23. The method of claim 15,
wherein the data frame is at least 29 bytes in length,
wherein the control frame is at most 20 bytes in length, and
wherein the acknowledgement is 14 bytes in length.

24. The method of claim 15, wherein the first station is a diagnostic tool.

25. The method of claim 15, wherein the first station is an administrative tool.

26. The method of claim 15, further comprising:
repetitively sending messages from the first station,
wherein the messages are sent as a data frames; and
monitoring at the first station for acknowledgements sent from the second station to the access point,
wherein the acknowledgements are sent as control frames.

27. The method of claim 26, further comprising determining that the second station is not a hidden node of the first station if the first station detects at least one acknowledgement sent from the second station to the access point.

28. The method of claim 26, further comprising determining that the second station is a hidden node of the first station if the first station fails to detect at least one acknowledgement sent from the second station to the access point.

29. A method of detecting a hidden node in a wireless local area network having a first station, a second station, and an access point, the method comprising:
sending a message from the access point to the second station,
wherein the message is sent as a data frame;
receiving the message from the access point at the second station;
sending an acknowledgement from the second station to the access point in response to receiving the message at the second station,
wherein the acknowledgement is sent as a control frame;
detecting the message sent from the access point at the first station; and
monitoring at the first station for the acknowledgement sent from the second station to the access point to detect the hidden node.

30. The method of claim 29, further comprising determining that the second station is a hidden node of the first station if the first station fails to detect the acknowledgement.

31. The method of claim 29, further comprising determining that the second station is not a hidden node of the first station if the first station detects the acknowledgement.

32. The method of claim 29, further comprising:
sending a message from the first station to the second station through the access point,
wherein the message is sent as a data frame; and
monitoring at the first station for an acknowledgement sent from the second station to the access point,
wherein the acknowledgement is sent by the second station in response to receiving the message from the access point,
wherein the acknowledgement is sent as a control frame.

33. The method of claim 29, wherein the data frame and the control frame are sent and received below a network layer in an OSI model.

34. The method of claim 29, wherein the data frame and the control frame are sent at a data link layer of an OSI model according to the IEEE 802.11 standard.

35. The method of claim 29,
wherein the data frame is at least 29 bytes in length,
wherein the control frame is at most 20 bytes in length, and
wherein the acknowledgement is 14 bytes in length.

36. The method of claim 29, wherein the first station is a diagnostic tool.

37. The method of claim 29, wherein the first station is an administrative tool.

38. A system for detecting a hidden node in a wireless local area network comprising:
a first station configured to:
send a message, monitor for an acknowledgement sent from a second station to an access point to detect the hidden node; an access point configured to:
receive a message from the first station,
send a message received from the first station to a second station;
a second station configured to:
receive a message sent from the access point,
send an acknowledgement to the access point in response to receiving a message from the access point;
wherein the acknowledgement is sent as a control frame; and
wherein the message is sent as a data frame.

39. The system of claim 38, wherein the first station is further configured to determine that the second station is a hidden node of the first station if the first station fails to detect the acknowledgement.

40. The system of claim 38, wherein the first station is further configured to determine that the second station is not a hidden node of the first station if the first station detects the acknowledgement.

41. The system of claim 38,
wherein the access point is further configured to send an acknowledgement to the first station in response to receiving a message from the first station, and
wherein the first station is further configured to receive an acknowledgement sent from the access point.

42. The system of claim 41, wherein the first station is further configured to resend a message if the first station fails to receive an acknowledgement from the access point for the message within a specified period of time.

43. The system of claim 38, wherein the message includes a header having a destination address set to the second station, a BSSID set to the access point, and a source address set to the first station.

44. The system of claim 38, wherein the data frame and the control frame are sent and received below a network layer in an OSI model.

45. The system of claim 38, wherein the data frame and the control frame are sent at a data link layer of an OSI model according to the IEEE 802.11 standard.

46. The system of claim 38,
wherein the data frame is at least 29 bytes in length,
wherein the control frame is at most 20 bytes in length, and
wherein the acknowledgement is 14 bytes in length.

47. The system of claim 38, Wherein the first station is a diagnostic tool.

48. The system of claim 38, wherein the first station is an administrative tool.

49. The system of claim 38, wherein the first station is further configured to:
repetitively send messages,
wherein the messages are sent as a data frames; and
monitor for acknowledgements sent from the second station to the access point,
wherein the acknowledgements are sent as control frames.

50. The system of claim 49, wherein the first station is further configured to determine that the second station is not a hidden node of the first station if the first station detects at least one acknowledgement sent from the second station to the access point.

51. The system of claim 49, wherein the first station is further configured to determine that the second station is a hidden node of the first station if the first station fails to detect at least one acknowledgement sent from the second station to the access point.

52. A computer readable medium comprising computer code for detecting a hidden node in a wireless local area network having a first station and a second station both associated with an access point, the computer readable medium comprising:
computer code for sending a message from the first station to the second station through the access point,
wherein the message is sent as a data frame; and
computer code for monitoring at the first station for an acknowledgement sent from the second station to the access point to detect the hidden node,
wherein the acknowledgement is sent by the second station in response to receiving the message from the access point,
wherein the acknowledgement is sent as a control frame.

53. The computer readable medium of claim 52, further comprising computer code for determining that the second station is a hidden node of the first station if the first station fails to detect the acknowledgement.

54. The computer readable medium of claim 52, further comprising computer code for determining that the second station is not a hidden node of the first station if the first station detects the acknowledgement.

55. The computer readable medium of claim 52, further comprising computer code for resending the message from the first station if the first station fails to receive an acknowledgement from the access point for the message within a specified period of time.

56. The computer readable medium of claim 52, wherein the message includes a header having a destination address set to the second station, a BSSID set to the access point, and a source address set to the first station.

57. The computer readable medium of claim 52, wherein the data frame and the control frame are sent and received below a network layer in an OSI model.

58. The computer readable medium of claim 52, wherein the data frame and the control frame are sent at a data link layer of an OSI model according to the IEEE 802.11 standard.

59. The computer readable medium of claim 52,
wherein the data frame is at least 29 bytes in length,
wherein the control frame is at most 20 bytes in length, and
wherein the acknowledgement is 14 bytes in length.

60. The computer readable medium of claim 52, wherein the first station is a diagnostic tool.

61. The computer readable medium of claim 52, wherein the first station is an administrative tool.

62. The computer readable medium of claim 52, further comprising:
computer code for repetitively sending messages from the first station,
wherein the messages are sent as a data frames; and
computer code for monitoring at the first station for acknowledgements sent from the second station to the access point,
wherein the acknowledgements are sent as control frames.

63. The computer readable medium of claim 62, further comprising computer code for determining that the second station is not a hidden node of the first station if the first station detects at least one acknowledgement sent from the second station to the access point.

64. The computer readable medium of claim 62, further comprising computer code for determining that the second station is a hidden node of the first station if the first station fails to detect at least one acknowledgement sent from the second station to the access point.

* * * * *